Patented Feb. 18, 1941

2,232,609

UNITED STATES PATENT OFFICE 2,232,609

DIMETHYLOLUREA-ESTER RESINOUS REACTION PRODUCTS

Ralph A. Jacobson, Landenberg, Pa., assignor to E. I. du Pont de Nemours & Company, Wilmington, Del., a corporation of Delaware No Drawing. Application June 16, 1938, Serial No. 214,049

14 Claims. (Cl. 260—70)

This invention relates to new resinous compositions of matter and to processes for their preparation and more particularly, it relates to new resinous products of dimethylolurea, prepared by the reaction of dimethylolurea and esters of hydroxy acids.

An object of this invention is to produce resinous products from dimethylolurea and esters of monohydroxy carboxylic acids containing less than 8 carbon atoms in the molecule.

A further object is to produce resinous products from dimethylolurea and aliphatic alcohol esters of aliphatic monohydroxy monocarboxylic acids containing less than 8 carbon atoms.

Another object of this invention is to produce resinous products from dimethylolurea, and esters of aliphatic alcohols of from 1 to 5 carbon atoms in chain length and aliphatic monohydroxy monocarboxylic acids containing less than 8 carbon atoms.

A still further object is to produce resinous products from dimethylolurea and esters of glycolic acid and aliphatic monohydric alcohols of from 1 to 5 carbon atoms in chain length.

Other objects and advantages of this invention will be apparent from the following specification in which the preferred details and embodiments are described.

These objects are accomplished, according to the present invention, by heating dimethylolurea with a hydroxy acid ester in an amount in excess of the molecular equivalent, and then removing the excess, unreacted hydroxy acid ester by distillation at reduced pressure until the residual syrupy resin solution attains the desired viscosity and solids content.

The temperature for conducting the reaction is not critical and this may be increased or reduced, though boiling water bath temperature is convenient. The use of too high temperatures as well as too rapid addition of the dimethylolurea may result in partial polymerization of the latter before reaction with the hydroxy ester has occurred, and hence lead to lower yields of condensation product through loss of dimethylolurea. In actual practice the temperatures used generally lie in the range of from about 80° C. to about 125° C.

The amount of water in the dimethylolurea can also be varied over wide limits or omitted altogether. As dimethylolurea is generally prepared it contains from 15 to 30% of water, and this water need not be removed since it does not interfere with the reaction with the hydroxy ester. In fact, dimethylolurea containing from 15 to 30 per cent of water is more stable (when it must be stored for indefinite periods) than anhydrous dimethylolurea, and hence from a practical standpoint it is desirable to retain and utilize the dimethylolurea in its moistened condition.

Water-wet dimethylolurea can be stored for many months in its soluble form if kept in a cold room at 0 to 5° C.

The use of catalysts is desirable for efficient production of the materials of this invention and, preferably, catalysts of an acidic nature should be employed. Thus, in addition to the phthalic anhydride used in the following examples, other material of an acidic nature such as benzoic and similar monocarboxylic acids, maleic acid, adipic acid and similar dicarboxylic acids as well as such tricarboxylic acids as citric acid, also acid salts and acid resins such as rosin, etc., and alkyd resins may be used. Inorganic acids such as hydrochloric, sulfuric, and phosphoric acid are likewise satisfactory.

Example I

A mixture of 606 parts by weight of isobutyl glycolate and 1 part of phthalic anhydride was placed in a vessel provided with a stirrer and a reflux condenser. The mixture was heated in a boiling water bath and 168 parts of dimethylolurea containing 18 per cent of water was slowly added during a 6-hour period. Finally the mixture was heated for an additional 4 hours making a total of 10 hours. The solution was filtered, and then concentrated at reduced pressure on a water bath to a weight of 469 parts or 60.5 per cent of the original weight. The isobutyl glycolate thereby recovered may be used for a succeeding run if desired.

The resin solution obtained in this manner is colorless and clear, with a viscosity of 1.25 poises. Flow-outs of this solution baked an hour at 127° C. gave hard, glossy, colorless films of good adhesion, flexibility, and water-resistance. The resin was compatible with blown castor oil, castor oil modified alkyd resins, and nitrocellulose. Baked films containing 1.2, 1.4, and 1.6 parts of a 55 per cent castor oil modified alkyd resin to one part of dimethylolurea-isobutyl glycolate resin were colorless, glossy, hard, tough, flexible, and water resistant. Films of both the dimethylolurea-isobutyl glycolate resin and its mixtures with a 55 per cent castor oil modified alkyd resin also air-dried satisfactorily to give excellent films.

Example II

A mixture of 104 parts of ethyl glycolate and 0.5 part of phthalic anhydride was heated in the equipment described in Example I, and 36.8 parts of dimethylolurea containing 18 per cent of water was slowly added. The mixture was heated for a total of 8 hours on the boiling water bath. The colorless solution was filtered and then concentrated at reduced pressure until the weight was 73 parts or 51.6 per cent of the original. Flow-outs on steel, baked at 127° C. for an hour, produced clear, hard, glossy, adherent but somewhat brittle films.

The resin solution was soluble in acetone, butyl acetate, isobutanol, toluene, and alcohol. It was also compatible with nitrocellulose solutions yielding clear colorless films from the nitrocellulose-resin solution.

Example III

A mixture consisting of 405 parts of methyl glycolate and 1 part of phthalic anhydride was heated on a boiling water bath. To this mixture was added slowly with stirring during 6 hours 187 parts of dimethylolurea containing 23 per cent of water. Heating was continued for an additional 4 hours or a total of 10 hours. The solution was filtered and concentrated by distillation at reduced pressure until the weight was 275 parts or 46.4 per cent of the original weight. The product was a clear colorless viscous syrup. It was soluble in alcohol and acetone. Flow-outs of the resin solution baked for 1 hour at 127° C. were colorless, hard and possessed excellent adhesion to steel.

Example IV

A mixture consisting of 236 parts by weight of ethyl lactate, and 0.5 part of phthalic anhydride was heated in a boiling water bath. To this mixture 73.5 parts of dimethylolurea containing 18 per cent of water were slowly added with efficient stirring. The mixture was heated for a total of 8 hours. The solution was filtered and then concentrated at reduced pressure until the weight amounted to 236 parts or 76.2 per cent of the original weight. The residue was a rather viscous solution with a slight opalescence. Flow-outs of this solution on glass and steel were baked at 127° C. for an hour giving clear, colorless, hard, adherent, somewhat brittle films. The resin solution was compatible with twice its volume of acetone, alcohol, or isobutanol and five times its volume of toluene.

Example V

A mixture of 130 parts of α-methylol methylisobutyrate (also called either the methyl ester of α, α-dimethyl hydracrylic acid or methyl hydroxypivalate) having the formula

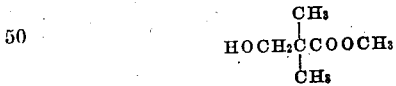

and 0.5 part of phthalic anhydride was heated in a boiling water bath. To this mixture was slowly added with stirring 36.5 parts of dimethylolurea containing 18 per cent of water. The mixture was heated for a total of 8 hours and filtered. The clear, colorless, filtrate was suitable for use as a coating composition. The resin solution was compatible with the common organic solvents such as alcohol, acetone, ethyl acetate, etc. It was also compatible with a 55 per cent castor oil modified alkyd resin.

Flow-outs of the unmodified resin solution baked for 1 hr. at 127° were colorless, hard, and had excellent adhesion to steel. The film was somewhat sensitive to water. However, baked films containing a 55 per cent castor oil modified alkyd resin in the ratio of 1 part of resin to 1.4 parts of modified alkyd were not only hard, tough and flexible but were resistant to water and dilute alkali.

While methyl glycolate, ethyl glycolate and isobutyl glycolate are described in the examples as specific hydroxy acid esters, I do not wish to be limited to these three esters of glycolic acid since other esters such as propyl, isopropyl, n-butyl, and the amyl alcohol esters, for example, will similarly condense. In general the lower esters of glycolic acid containing from 1 to 5 carbon atoms in the alcohol portion of the ester are to be preferred since they are better solvents for the dimethylolurea than the higher alcohol esters. In the case of higher esters such as octyl, dodecyl, octadecyl, etc., it is generally necessary either to use a mutual solvent or also to add the dimethylolurea very slowly. It is also necessary to guard against excessive heating which might promote repolymerization of the dimethylolurea before reaction with the glycolic ester can occur. In place of ethyl lactate of Example IV I may employ methyl lactate, propyl lactate, n-butyl lactate, amyl lactate and other esters of lactic acid. Furthermore, other beta-hydroxy esters than the one described in Example V may be used, such as esters of hydracrylic acid ($HOCH_2CH_2COOH$), alpha-methylolpropionic acid

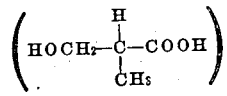

alpha-hydroxy butyric acid, alpha-hydroxy caproic acid, etc. Esters of gamma-hydroxy, delta-hydroxy and other hydroxy acids in which the hydroxyl group is still further removed from the carboxyl group may also be employed, e. g., esters of such acids as beta- and gamma-hydroxy butyric acids, delta-hydroxy caproic acid, etc. Esters of hydroxy dicarboxylic acids such as the esters of tartronic, malic, alpha- and beta-hydroxy glutaric, alpha- and beta-hydroxy-adipic, etc., may be used.

The esters may be those of aliphatic, monohydric or of polyhydric alcohols, e. g., glycol, glycerol, diethylene glycol, etc.

The products of the present invention are particularly adaptable for use as protective and decorative coatings for metal, wood, glass, hard rubber, molded plastic, synthetic resin products, etc. The products may be applied to the materials by methods well known in the art such as by spraying, brushing, dipping or roller coating. When combined with other film-forming ingredients as previously noted, compositions possessing varying properties may be obtained, depending on the nature of the modifying ingredient. The combination of a dimethylolurea-hydroxy ester resin with oil-modified alkyd resins gives particularly hard, glossy, water-resistant compositions adaptable for many purposes as, for example, refrigerator enamels. When used with cellulose derivatives baking at elevated temperatures is not necessary, since the products will satisfactorily air-dry. When combined with film-forming materials other than cellulose derivatives, however, baking at elevated temperatures for a short period of time is usually desirable from an economic standpoint.

Various changes may be made in practicing the present invention without departing therefrom or sacrificing any of the advantages thereof.

I claim:

1. A process for the production of resinous materials which comprises reacting, in the presence of an acid catalyst, dimethylolurea with an aliphatic alcohol ester of a monohydroxy monocarboxylic acid in an amount in excess of the molecular equivalent, said ester being derived from an acid containing less than 8 carbon atoms and from an alcohol containing from 1 to 5 carbon atoms, and removing the excess unreacted hydroxy acid ester by distillation at reduced pressure.

2. A process for the production of resinous materials which comprises the steps of heating a 1 to 5 carbon atom aliphatic alcohol ester of a monohydroxy monocarboxylic acid containing less than 8 carbon atoms to a temperature in the range of 80 to 125° C., slowly adding not more than one-half the molecular equivalent amount of dimethylolurea containing water, heating until reaction is complete, and removing the excess hydroxy acid ester by concentration at reduced pressure, the process being carried on in the presence of an acid catalyst.

3. A process for the production of resinous materials which comprises the steps of heating an ester of a 1 to 5 carbon atom aliphatic alcohol and a monohydroxy monocarboxylic acid of less than 8 carbon atoms, in the presence of an acid catalyst to 100° C., slowly adding thereto, over a period of 6 hours, one-half the molecular equivalent amount of dimethylolurea containing 15-30% water required to react with the ester, continuing the heating of the resultant material for 4 hours, filtering the resultant solution, and removing the excess ester by concentrating the solution at reduced pressure.

4. A process for the production of resinous materials which comprises the steps of heating an ester of a 1 to 5 carbon atom aliphatic alcohol and a monohydroxy monocarboxylic acid of less than 8 carbon atoms in the presence of catalytic amounts of phthalic anhydride to 100° C., slowly adding thereto, over a period of 6 hours, one-half the molecular equivalent amount of dimethylolurea containing 18% water required to react with the ester, continuing the heating of the resultant material for 4 hours, filtering the resultant solution, and removing the excess ester by concentrating the solution at reduced pressure.

5. A process for the production of resinous materials which comprises the steps of heating isobutyl glycolate containing an acid catalyst to a temperature of 80–125° C., slowly adding thereto less than the molecular equivalent amount of dimethylolurea containing 15 to 30% water, heating the resultant material until reaction is completed, and removing the excess isobutyl glycolate by concentrating the solution at reduced pressure.

6. A process for the production of resinous materials which comprises the steps of heating isobutyl glycolate containing an acid catalyst to a temperature of 80–125° C., slowly adding thereto less than the molecular equivalent amount of dimethylolurea containing 15 to 30% water, heating the resultant material for several hours, filtering the resultant solution, and removing the excess isobutyl glycolate by concentrating the solution at reduced pressure.

7. A process for the production of resinous materials which comprises the steps of heating isobutyl glycolate, in the presence of catalytic amounts of phthalic anhydride, to a temperature of 80–125° C., slowly adding thereto less than the molecular equivalent amount of dimethylolurea containing 15 to 30% water, heating the resultant material for several hours, filtering, and removing the excess isobutyl glycolate by concentrating the solution at reduced pressure.

8. A process for the production of resinous materials which comprises the steps of heating 606 parts by weight of isobutyl glycolate and one part by weight of phthalic anhydride to a temperature in the range of 80–125° C., slowly adding thereto 168 parts of dimethylolurea containing 15 to 30% water, thereafter continuing the heating for 4 hours, filtering, and concentrating said solution at reduced pressure to a weight of 469 parts.

9. A process for the production of resinous materials which comprises the steps of heating 606 parts by weight of isobutyl glycolate and one part by weight of phthalic anhydride to a temperature of 100° C., slowly adding thereto over a 6-hour period 168 parts of dimethylolurea containing 18% water, continuing the heating for 4 hours, filtering, and concentrating the solution at reduced pressure to a weight of 469 parts.

10. As a new composition, a resinous product obtained by reaction between dimethylolurea and a glycolic acid ester.

11. As a new composition, a resinous product obtained by reaction between dimethylolurea and an isobutyl glycolate.

12. As a new composition a resinous reaction product of dimethylolurea and an aliphatic alcohol ester of a monohydroxy monocarboxylic acid containing less than 8 carbon atoms, the aliphatic alcohol portion of the ester containing from 1 to 5 carbon atoms.

13. The process for the production of resinous materials which comprises reacting with dimethylolurea, in the presence of an acid catalyst, an ester of an aliphatic alcohol containing from 1 to 5 carbon atoms and a monohydroxy monocarboxylic acid containing less than 8 carbon atoms, the ester being employed in excess of the molecular equivalent.

14. The process for the production of resinous materials which comprises reacting with dimethylolurea, in the presence of an acid catalyst, an ester of an aliphatic alcohol containing from 1 to 5 carbon atoms and a monohydroxy monocarboxylic acid containing less than 8 carbon atoms, the ester being employed in excess of the molecular equivalent, and removing the excess hydroxy acid ester by distillation at reduced pressure.

RALPH A. JACOBSON.